RECORDING CHART AND CHANGER THEREFOR

Filed Dec. 19, 1960 4 Sheets-Sheet 1

F I G. I

INVENTOR.
BOBBY G. STOOPS

BY *Hazard & Miller*

ATTORNEYS.

RECORDING CHART AND CHANGER THEREFOR

Filed Dec. 19, 1960

INVENTOR.
BOBBY G. STOOPS
BY Hazard & Miller
ATTORNEYS.

RECORDING CHART AND CHANGER THEREFOR
Filed Dec. 19, 1960
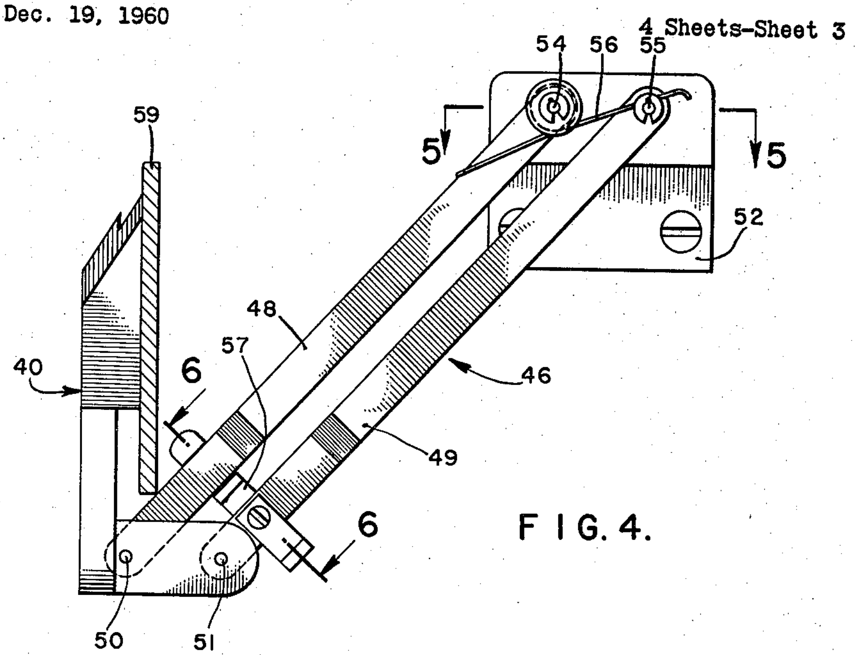
FIG. 4.
FIG. 6.
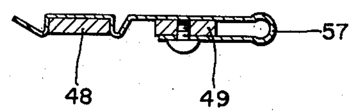
FIG. 5.
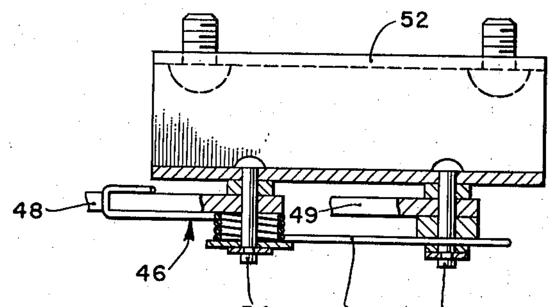
FIG. 7.
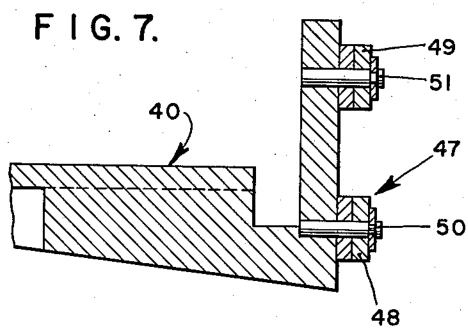
INVENTOR.
BOBBY G. STOOPS
BY Hazard & Miller
ATTORNEYS.

RECORDING CHART AND CHANGER THEREFOR

Filed Dec. 19, 1960 4 Sheets-Sheet 4

INVENTOR.
BOBBY G. STOOPS

BY *Hazard & Miller*

ATTORNEYS.

3,103,402
Patented Sept. 10, 1963

3,103,402

RECORDING CHART AND CHANGER THEREFOR

Bobby G. Stoops, Monterey Park, Calif., assignor to Barton Instrument Corporation, Monterey Park, Calif., a corporation of California Filed Dec. 19, 1960, Ser. No. 76,832
10 Claims. (Cl. 346—68)

This invention relates to improvements in circular recording charts and to an apparatus for automatically effecting a change of charts so as to remove a chart from a stack or bank of charts after a record has been completely traced thereon.

Explanatory of the present invention, many records are prepared by rotating a circular chart behind or beneath one or more pens that are excited or triggered to measure a variable. The chart is rotated steadily and continuously in accordance with time and in the usual situation, twenty-four hours are required to rotate the chart through one complete revolution. The chart has imprinted thereon concentric circles and in the usual situation the zero circle is innermost but leaving at the center of the chart a normally unused area or an area which is normally not traversed by any of the recording pens. The circle indicative of the maximum of the variable is located near the peripheral edge of the chart. The chart has also imprinted thereon approximately radial lines that are equally spaced from each other and which divide the chart into increments or intervals of time. These lines are not true radii but are usually curved so as to be coincident with the arc of swing of the pens.

When a chart has been rotated one complete revolution and the record or records have been traced thereon by the pens, it is usually necessary or next highly desirable to replace the used chart with a succeeding chart. However, it is rare that an attendant will be at the recording apparatus at the precise instant of time when one chart has completed its revolution, and it is desired to transfer the record that is being continuously formed to a succeeding chart. Consequently, it has heretofore been proposed to provide an apparatus which would automatically remove the foremost chart of a stack or bank of charts and effect a transfer of the pens to the next subjacent chart.

One such apparatus is disclosed in United States Letters Patent No. 2,703,745 issued March 8, 1955, to T. K. M. Smith. The apparatus disclosed in that patent contemplates the use of a stack or bank of charts each of which are slitted on one of the approximately radial lines from a point adjacent the periphery of the chart to a semicircular slit located adjacent the zero circle. A small bridge of the chart material is left connected near the peripheral edge of the chart for the purpose of holding the slitted chart together until the time of use. This bridge consequently must be broken by the attendant just before each chart starts its recording cycle or recording revolution and the automatic changing ability of this construction is limited to more than one but less than two complete revolving charts.

It has also been proposed in United States patent application Serial No. 42,905 filed July 14, 1960 by Robert Graham to slit the chart along one of the approximately radial lines all the way from the peripheral edge of the chart to the center hole that is normally present at the center of the chart, thus defining a leading edge and a trailing edge on opposite sides of the slit. In that construction a tab that is coincident in length with the length of the slit was glued or otherwise fastened against the reverse side of the leading edge of the chart and extended through the slit onto the obverse side of the trailing edge. This tab was utilized to lift the leading edge of the chart in the course of its rotation and cause it to move forwardly of the pens as the rotation proceeded. Such a construction had the disadvantage that the attachment of a separate piece of material to the obverse side of the leading edge involved a slow and difficult manufacturing process. Furthermore, when the tab was coincident in length with the length of the slit it added extra thickness to a stack of charts which extra thickness extended across the entire recording range of the chart in the vicinity of the slit and required the inking pens to be raised and lowered as they recorded on the chart in this vicinity. That portion of the tab which extended over the obverse side of the trailing edge of the chart had the effect of concealing that portion of the chart at the time that the chart was read or interpreted and either had to be folded back or otherwise removed in order to expose the obverse side of the trailing edge. Where the slit extended completely from the periphery to the center hole in the chart, this allowed the chart to spread to an undesirable degree when the chart was being calculated or interpreted by means of a mechanical integrator.

One object of the present invention is to provide an improved circular chart that has been designed for use in conjunction with an automatic changing mechanism wherein the chart is slitted or divided on one of the approximately radial lines from the periphery of the chart toward the center hole but leaving a bridge of chart material near the center hole. In this manner, it is not necessary for the attendant to break the bridge near the peripheral edge of the chart at the commencement of each chart's use and the retained bridge near the center hole is utilized to keep the chart from objectionably spreading when read or interpreted by a mechanical integrator.

A tab is provided which extends through the slit from the under or reverse side of the leading edge onto the obverse side of the trailing edge to facilitate the lifting of the leading edge and causing its movement in front or in advance of the pens in effecting a change of one chart to another. However, this tab, instead of being formed of a section of separate material that is attached to the chart, is struck out from the material of the chart itself and preferably from the normally unused center area that is disposed within the zero circle. It occupies only a small portion of the obverse side of the trailing edge and is preferably located at or near the zero circle. Consequently, its presence does not materially increase the thickness of the stack of charts throughout the recording range in the vicinity of the slit and it does not conceal or cover any substantial portion of the chart near the trailing edge.

Another object of the invention is to provide a chart having the above-mentioned characteristics that has an indexing and drive notch formed in the peripheral edge of the chart on the trailing edge portion or in the vicinity thereof. This arrangement not only facilitates indexing of the chart but enables the friction of the recording pens to slightly open the slit so that there is no danger of leading edges interleaving or shuffling between trailing edges of subjacent charts.

Still another object of the invention is to provide an improved automatic changing apparatus which will consecutively lift charts from a stack or bank after they have been revolved one complete revolution whereby an automatic changing of charts may be continued indefinitely.

With the foregoing and other objects in view, which will be made manifest in the following detailed description and specifically pointed out in the appended claims, reference is had to the accompanying drawings for an illustrative embodiment of the invention, wherein:

FIG. 4 is a partial view taken substantially upon the line 4—4 upon FIG. 1 in the direction indicated but illustrating the mechanism in that position wherein the stripper is held in its forwardmost position enabling replacement of a stack of charts on the base or carrier;

FIG. 5 is a partial view in vertical section taken substantially upon the line 5—5 upon FIG. 4;

FIG. 6 is a view in section taken substantially upon the line 6—6 upon FIG. 4;

FIG. 7 is a sectional view taken substantially upon the line 7—7 upon FIG. 1;

Figure 1:
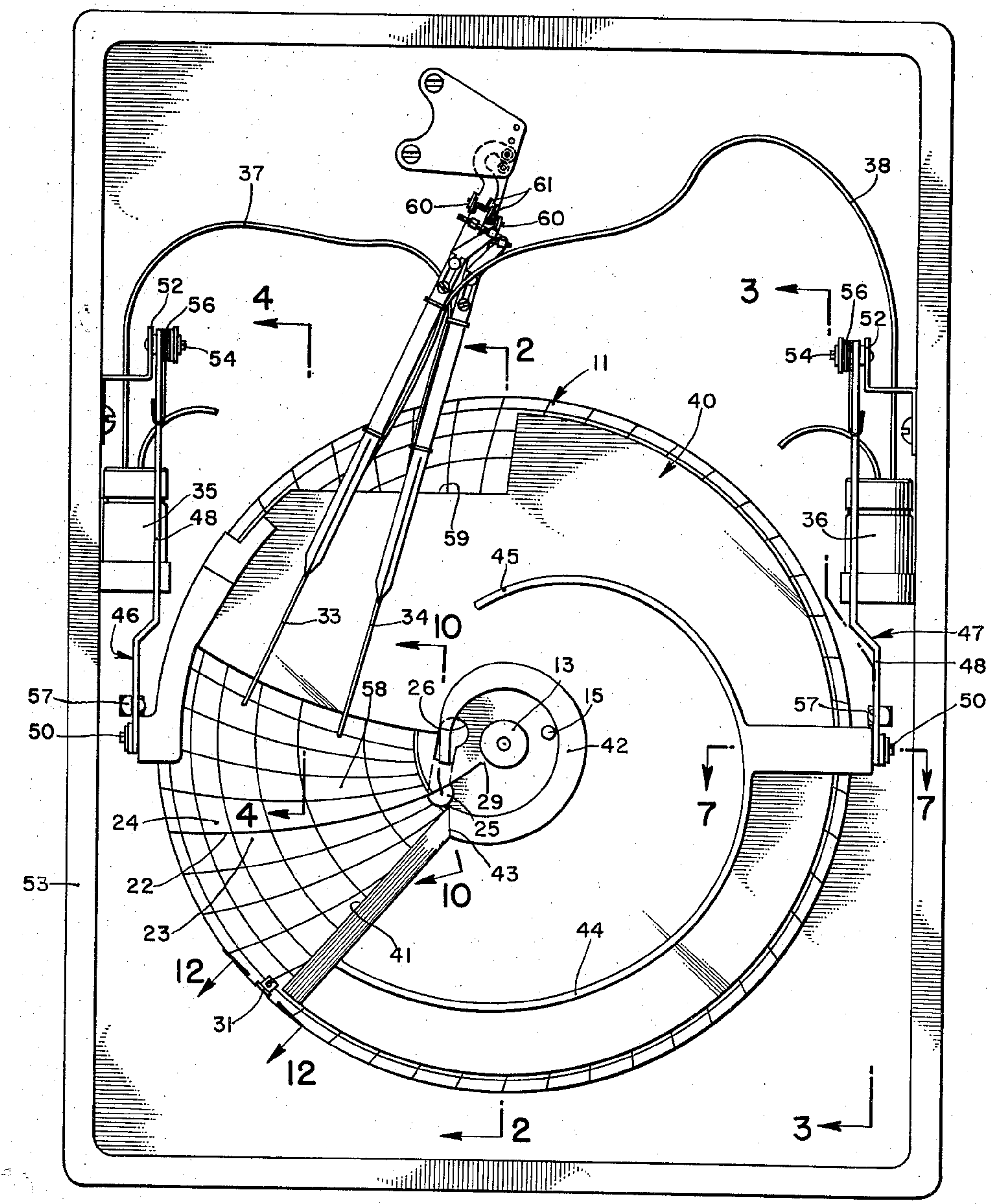
FIGURE 1 is a front view in elevation of the mechanism embodying the present invention illustrating charts embodying the present invention as having been applied thereto.
Figure 2:
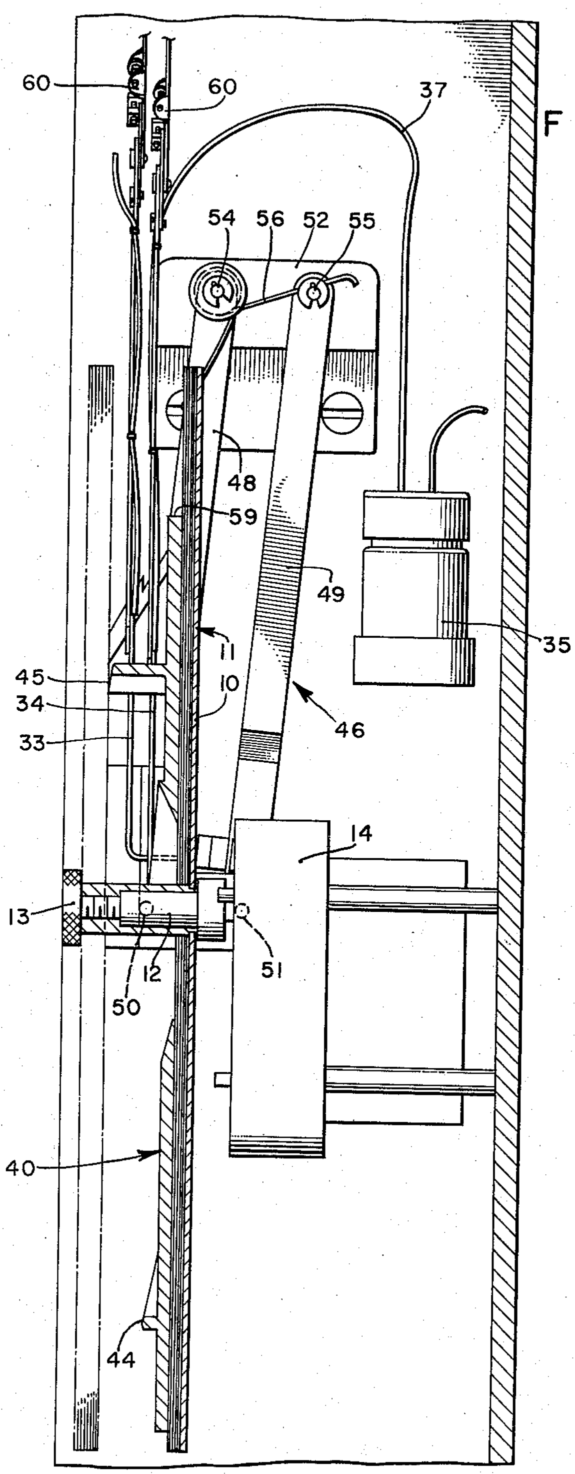
FIG. 2 is a vertical section taken substantially upon the line 2—2 upon FIG. 1 in the direction indicated.

Referring to the accompanying drawings wherein similar reference characters designate similar parts throughout, 10 indicates a circular plate against the forward face of which a stack or bank 11 of circular charts embodying the present invention is adapted to be positioned. This plate has a central shaft 12 equipped with a removable cap screw 13. The shaft 12 and plate 10 are adapted to be steadily and continuously rotated by means of a driving mechanism such as a mechanical or electrical timer 14. In conformity with conventional practice the plate is usually equipped with a projecting pin or stud 15 arranged eccentrically with respect to the shaft 12 and which is receivable through apertures in the charts positioned on the plate 10 to drive the same.

Figure 9:
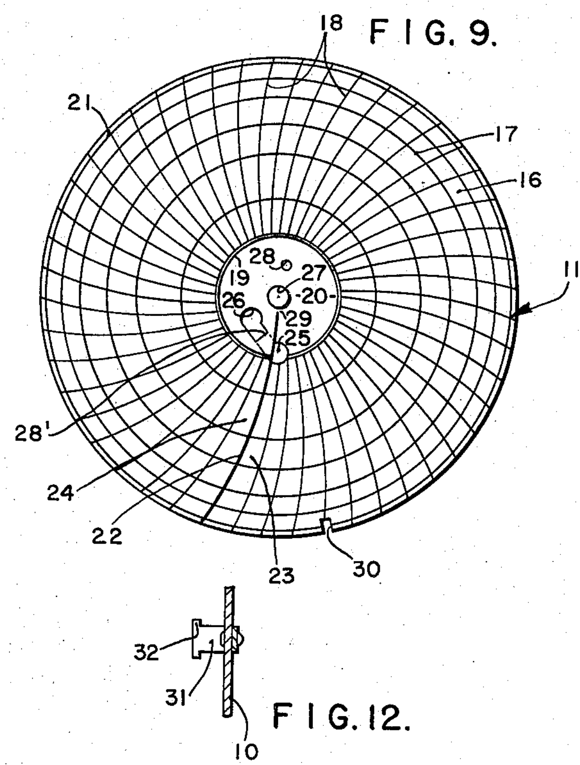
FIG. 9 is a view in elevation of one of the charts.
Figure 11:
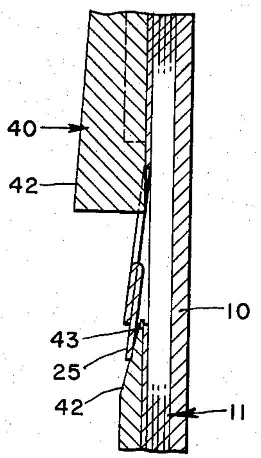
FIG. 11 is a view similar to FIG. 10, but illustrating the chart as having been slightly rotated from the position shown in FIG. 10.

Each chart forming the stack or bank 11 is of the type illustrated in FIG. 9 consisting of a circular section of cardboard or paperboard 16 on which there are printed concentric circles 17 and approximately radial lines 18 that are equally spaced from each other. The innermost circle 19 may be regarded as the zero circle of the chart and surrounds a normally unused area 20. The outermost circle 21 arranged adjacent the peripheral edge of the chart represents the greatest magnitude recordable on the chart.

In accordance with the present invention the chart is slitted or divided at 22 along one of the radial lines 18, thus dividing the chart so that it has a trailing edge portion 23 and a leading edge portion 24 considered in the direction of rotation of the chart.

A tab 25 is struck out of the normally unused central area 20 leaving a hole 26 therein arranged eccentrically with respect to the hole 27 that receives the shaft 12. This is also disposed remote from the hole 28 that normally receives the driving pin 15. This tab, after being struck out, is reversely folded on the fold line 28' so that it occupies a position against the under or reverse side of the leading edge 24. It extends through the slit 22 and projects a short distance onto the trailing edge 23. It is preferably located near the zero circle 19 so that it does not occupy any substantial portion of the trailing edge 23 in the range of the chart.

Figure 12:
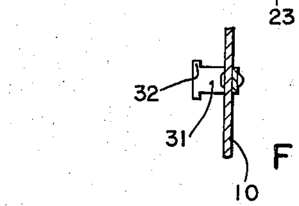
FIG. 12 is a partial view in vertical section taken substantially upon the line 12—12 upon FIG. 1.

The slit 22 does not extend entirely to the hole 27 but a bridge 29 is left between the inner end of the slit and the hole. This bridge is never intended to be broken and is utilized to hold the chart against opening at the slit in spite of the fact that the chart has been radially slitted. In the peripheral edge of the chart and either in or near the trailing edge portion 23 there is formed a notch 30. This notch is applicable to a T-shaped driving head 31, see FIG. 12, with the sides of the notch fitting snugly against the sides of the shank of the driving head. The head portion of the T-shaped driving head does not project greatly beyond the sides of the shank so that these projecting portions 32 serve to hold the charts against the plate 10 until such time as the chart may have the edges of the notch 30 forcibly sprung thereover.

The recording apparatus includes one or more pens, two of which are illustrated, indicated at 33 and 34. These pens are supplied with ink from ink reservoirs 35 and 36 through flexible hoses 37 and 38. The pens are triggered or excited in accordance with variations of the variable to be measured and swing through arcs that are coincident with the curvatures of the approximately radial lines 18 at the point where the pens engage the chart during the course of revolution of the chart.

As the front of the stack 11 of superposed charts that are positioned against the circular plate 10 there is a stripper 40. This stripper is normally urged continuously against the stack 11 and presents a radial beveled edge 41 and a circular beveled edge 42 forming a pointed edge 43 that is arranged in the circular path of the tab 25.

On the forward side of the stripper there is formed a generally helical cam 44, the height of which is very low near the beveled edge 41 but which gradually increases to a high point 45 near its opposite end. This helical cam is of sufficient height at the point 45 so that a chart pressing thereagainst will be held forwardly of the pens 33 and 34. The stripper is mounted for movement toward and away from the circular plate 10 by means of opposed parallelogram linkages generally indicated at 46 and 47.

As illustrated in FIG. 4, the linkages consist of two parallel links 48 and 49 pivotally connected to the side of the stripper at 50 and 51, respectively. These linkages are also pivotally connected to a bracket 52 mounted on the housing 53 at 54 and 55. Springs 56 urge the links 48 and 49 to swing downwardly and rearwardly. However, a spring clip 57 is mounted on the link 49 engageable with the link 48 when the stripper is swung into its position forwardly and upwardly relative to the plate 10 as illustrated in FIG. 4. This spring clip is intended to releasably hold the links and consequently the stripper in this position whenever a stack or bank of charts 11 is being applied to the plate 10. After the charts have been applied the spring clip 57 is manually caused to disengage the link 48 and when this occurs the spring 56 is effective to cause the links 48 and 49 to swing downwardly and rearwardly and thus press the stripper against the forward side of the stack or bank 11 of charts. The parallelogram linkage 47 is of similar construction to the linkage 46 above described, and by reason of the parallelogram linkages the rear face of the stripper 40 will always be perfectly parallel to the forward side of the plate 10 regardless of the thickness of the stack 11 that is between the stripper and the plate 10. Consequently, regardless of the number of charts that are between the stripper and the plate the stripper will always press the charts toward the plate 10 without any tendency towards tilting relatively thereto or distorting the charts.

The stripper has an open area 58 adjacent the beveled edge 41 and presents a horizontal edge 59 near its top. The arms of the pens 33 and 34 have pivoted joints 60 equipped with torsion springs 61. These torsion springs are effective to constantly urge the pen arms to press their styluses against the obverse face of the foremost chart. However, when the stripper 40 is swung forwardly and upwardly to replace a bank of charts or into the position illustrated in FIG. 4, the edge 59 engages the under sides of the pen arms and swings the pen arms upwardly and forwardly about their pivoted joints as centers so that during the replacement the pen arms are automatically held out of engagement with the charts. When the stripper is returned to its normal position pressing against the bank or stack 11 the torsion springs 61 serve to automatically return the pen arms to their scribing positions.

The operation of the above-described construction is substantially as follows:

With a stack or bank of charts on the plate 10 the foremost chart has the record of the variable or variables traced thereon by the pens 33 and 34 as the chart is revolved. This record commences at the leading edge 24. As the chart revolves that portion of the tab 25 lying against the obverse side of the trailing edge 23 encounters the beveled point 43 on the stripper with the result that the tab passes upwardly on the beveled point and flexes the leading edge 24 upwardly. The leading edge ultimately encounters the beveled edge 41 and is flexed upwardly thereby onto the helical cam 44. As the revolution of the plate 10 and charts thereon continues the chart is in effect flexed or deformed into a helix and when the trailing edge 23 passes beneath the pens the leading edge 24 of the next subjacent chart is exposed. Consequently, the pens merely drop from the trailing edge 23 of the foremost chart onto the leading edge of the next subjacent chart. This cycle of operation will continue until the charts of the bank or stack 11 have been exhausted.

Figure 3:
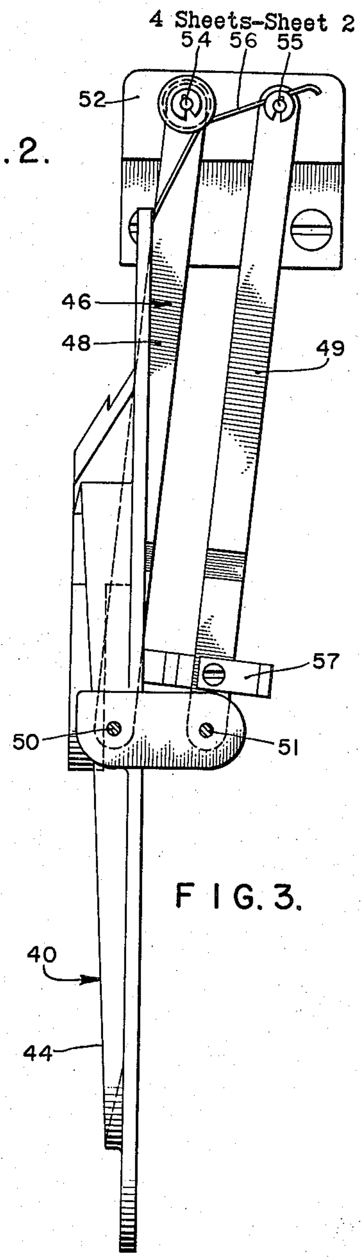
FIG. 3 is a sectional view taken substantially upon the line 3—3 upon FIG. 1 in the direction indicated.
Figure 8:
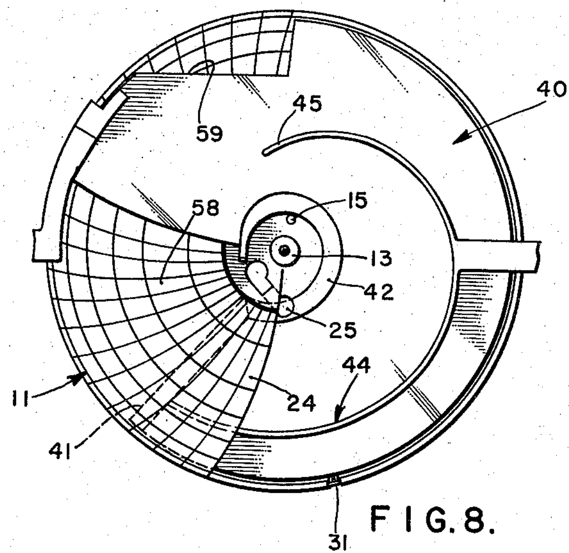
FIG. 8 is a partial view illustrating a step occurring in the course of stripping one chart from the stack of charts.
Figure 10:
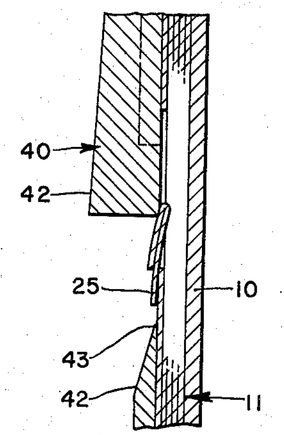
FIG. 10 is a partial view in vertical section on an enlarged scale taken substantially upon the line 10—10 upon FIG. 1.

When each trailing edge portion is caused to ride forwardly or upwardly on the helical cam 44 eventually the pressure will be sufficient to strip the sides of the notch 30 over the projecting portions 32 of the T-shaped head 31, thus completely detaching the chart from the plate 10 except for the retention thereon by the cap screw 13. An attendant regardless of the time that he arrives at the recording mechanism can remove the used charts by merely unscrewing the cap screw 13 and lifting the charts from the shaft 12 and the pin 15. Whenever the stack of charts on the plate 10 must be replenished the stripper can be swung forwardly by means of its parallel linkages 46 and 47 from the position shown in FIG. 3 to the position shown in FIG. 4, and locked in the position shown in FIG. 4 by the clip 57. During this movement the pens are automatically swung forwardly and upwardly and the stripper is held out of the way during the period required to apply a new stack of charts to the plate 10.

It will be appreciated from the above-described construction that the improved chart, by reason of its construction, can be easily and economically manufactured and possesses a number of important advantages; also, that the changing apparatus designed for use in conjunction therewith will effectively and efficiently remove a chart from the stack after the record made thereon has been completed.

Various changes may be made in the details of construction without departing from the spirit and scope of the invention as defined by the appended claims.

I claim:

1. A circular recording chart which is divided on the line extending from its peripheral edge towards its center defining leading and trailing edges, and a tab secured to the reverse side of the chart adjacent the leading edge and extending across the line of division and positioned partially against the obverse side of the chart near its trailing edge, said tab occupying but a small fraction of the length of the trailing edge.

2. A circular recording chart which is divided on the line extending from its peripheral edge towards its center defining leading and trailing edges, and a tab struck out of a portion of the chart adjacent the leading edge, reversely folded against the reverse side of the chart and extending across the line of division and onto the obverse side of the trailing edge.

3. A circular recording chart which is divided on the line extending from its peripheral edge towards its center defining leading and trailing edges, and a tab secured to the reverse side of the chart adjacent the leading edge and extending across the line of division and positioned partially against the obverse side of the chart near its trailing edge, said tab occupying but a small fraction of the length of the trailing edge and being arranged adjacent the center of the chart.

4. A circular recording chart which is divided on the line extending from its peripheral edge towards its center defining leading and trailing edges, and a tab struck out of a portion of the chart adjacent the leading edge reversely folded against the reverse side of the chart and extending across the line of division and onto the obverse side of the trailing edge, said tab being arranged adjacent the center of the chart.

5. A circular recording chart which is divided on the line extending from its peripheral edge towards its center defining leading and trailing edges, and a tab struck out of a portion of the chart adjacent the leading edge reversely folded against the reverse side of the chart and extending across the line of division and onto the obverse side of the trailing edge, the peripheral edge of the chart being notched a short distance in advance of the trailing edge to receive a driving means by which the chart may be rotated.

6. In a recorder, a rotary plate adapted to receive and rotate a stack of circular charts divided on approximately radial lines defining leading and trailing edges, a stripper engageable beneath the leading edges of the charts consecutively as they rotate to consecutively remove the charts from the stack, means including linkages pivotally connected to opposed sides of the stripper for maintaining the stripper parallel to the plate but permitting it to move toward or away from the plate, spring means urging the stripper toward the plate, and means for releasably holding the stripper in a position remote from the plate while charts are being replaced on the plate.

7. In a recorder, a rotary plate adapted to hold and rotate a stack of circular charts divided on approximately radial lines defining leading and trailing edges, a stripper movable toward and away from the plate presenting an edge and a helical cam adapted to be traversed by the leading edges of the charts consecutively as the stack is rotated to consecutively remove charts from the stack and expose the next subjacent chart, and means on each chart for causing its leading edge to be disposed forwardly of the edge on the stripper so as to be guided thereby onto the cam.

8. In a recorder, a rotary plate adapted to receive and rotate a stack of circular charts divided on approximately radial lines defining leading and trailing edges, stripping means urged toward the plate and engageable beneath the leading edges to consecutively strip charts from the stacks, said charts having peripheral notches adjacent their trailing edges, a T-shaped head on the plate the shank of which is receivable in the notches by which the charts are indexed and driven, and means enabling but restricting movements of the stripping means to positions parallel to the plate.

9. A circular recording chart which is divided on a line extending from its peripheral edge towards its center defining leading and trailing edges of the chart, and a tab struck out of a portion of the chart adjacent one of said edges reversely folded against one side of the chart and extending across the line of division and positioned against the other side of the chart adjacent the other of said edges, said tab serving to disalign one edge with respect to the other.

10. In a recorder, a rotary plate adapted to receive and rotate a stack of circular charts divided on approximately radial lines defining leading and trailing edges, a stripper engageable beneath the leading edges of the charts consecutively as they rotate to consecutively remove the charts from the stack, a pair of links on each side of the stripper, means pivotally mounting one end of each link on a stationary support, means pivotally mounting the other end of each link to the side of the stripper for maintaining the stripper parallel to the plate but permitting it to move toward or away from the plate, spring means urging the stripper toward the plate, one or more pens movable over the charts as the charts rotate, said pens being swingable toward and away from the plate, said stripper presenting an edge engageable with the pens for swinging the pens away from the plate when the stripper is moved away from the plate, and means for releasably holding the stripper in a position away from the plate and as a consequence holding the pens away from the plate.

References Cited in the file of this patent

UNITED STATES PATENTS

| | | |
|---|---|---|
| 506,988 | Fecht | Oct. 17, 1893 |
| 919,622 | McComb | Apr. 27, 1909 |
| 2,703,745 | Smith | Mar. 8, 1955 |
| 2,978,287 | Daugherty | Apr. 4, 1961 |

OTHER REFERENCES

Ser. No. 352,111, Fornbacher (A.P.C.) published May 25, 1943.